2,868,658

CERAMIC BODIES

William W. Coffeen, Westfield, N. J., assignor to Metal & Thermit Corporation, New York, N. Y., a corporation of New York No Drawing. Application May 11, 1956
Serial No. 584,194

13 Claims. (Cl. 106—65)

This invention relates to the preparation of a ceramic body from tin oxide, a bismuth compound and minor amounts of iron, cobalt, nickel, zinc, manganese or copper compounds, and to the product formed thereby. This application is a continuation-in-part of application Serial No. 280,175, filed April 2, 1952, now abandoned.

Most of these bodies possess excellent electrical insulating properties and furthermore are non-wetting, thereby providing superior insulating characteristics under conditions of high humidity. They additionally have good strength, low thermal expansion, high thermal conductivity, high resistance to thermal shock, high dielectric strength, high electrical resistivity and excellent resistance to chemical attack by acids. The bodies incorporating manganese or copper oxides do not have quite as good electrical insulating characteristics as the others, but are dense and non-porous.

The primary uses of these ceramic bodies will be found in insulating bushings, vacuum tube spacers, coil forms, spark plug insulators and thread guides.

Attempts have been made to produce a dense non-porous body of tin oxide alone but, since tin oxide sublimes at a temperature of about 2800° F., these attempts have not been successful. I have found that porous bodies of tin oxide alone, when perfectly dry, exhibit both high resistivity and low power factors but, upon exposure to air, even at ordinary humidities, lose these properties.

I have discovered that compounds of bismuth, when used with tin oxide and minor amounts of iron, cobalt, nickel or zinc oxides, will produce a dense, non-porous body which possesses the characteristics named heretofore.

The structure of these fired ceramics is not known. It is customary to analyze ceramics of this type for their metal content and express the composition in terms of the metal oxide (where the metal is polyvalent, the oxide believed to be most stable at the maturing temperature is assumed). Compositions within the scope of the invention may be made with a bismuth oxide content ranging from about 0.5% to about 50%, and more particularly from about 1% to about 10%; tin oxide ranging from about 50% to about 99.5% and at least one metal oxide from the group consisting of iron, cobalt, nickel, zinc, manganese and copper from about 0.03% to about 0.3%. The preferred range comprises about 1% to about 3% of bismuth oxide and about 99% to about 97% of tin oxide, the tin oxide percentage including the small amount of the accessory oxide (about 0.03% to about 0.1%). Percent compositions are by weight. Bodies prepared with compositions in the preferred range exhibit superior electrical properties.

The bismuth may be added as bismuth trioxide or any compound of bismuth which will form (or dissociate to) the oxide upon heating to the maturing temperature or lower. Any compound of bismuth which upon similar heat treatment forms a stannate containing bismuth is also considered the full equivalent of bismuth trioxide. In a similar manner, the oxides of iron, cobalt, nickel, zinc, manganese or copper may be added as the oxide, or in the form of a compound which will form the oxide upon heating to the maturing temperature or lower or which will react as the stannate. Compositions within the scope of the invention may be prepared by reacting such bismuth compounds as bismuth trioxide, bismuth pentoxide, bismuth stannate, bismuth fluoride, bismuth carbonate, bismuth hydroxide, bismuth nitrate, bismuth sub-nitrate, bismuth dioxide, bismuth oxyfluoride, bismuth oxalate, bismuth acetate, etc. Similarly the accessory metal may be added to the reaction mixture in the form of the nitrate, the oxide, the carbonate, the fluoride, the acetate, etc.

The following examples are illustrative of the preparation of these ceramic bodies and it is understood that the invention is not limited thereto.

*Example 1*

One manner in which my ceramic bodies may be prepared is the following: to 50 grams of tin oxide containing .05% FeO was added 1 gram of bismuth trioxide and 100 cc. of water. The batch was thoroughly mixed by blunging and evaporated to dryness. The dry powder was pulverized to pass through a 100 mesh screen. To the dry material, 3 cc. of a 2½% starch solution was added in a mortar. From this damp powder, small discs, i. e. 1¼" in diameter and about 100 mils thick were pressed using a pressure of 20,000 pounds per square inch. The pressed discs were oven-dried and fired on alumina plates at 2700° F. in an electric furnace. The fired discs were found to have zero absorption after boiling in carbon tetrachloride for several hours. The discs were strong, non-wettable by water and at 1 mc. and room temperature had dielectric constants averaging about 8, power factors averaging about .0005, electrical D. C. resistivity in excess of 100,000 megohms, and dielectric strength 500 volts/mil.

A second and preferable method which can be used in the preparation of these bodies may be generally described as the co-precipitation of the bismuth compound, and an oxide of the group iron, cobalt, nickel, manganese, copper and zinc in a tin hydrate slurry followed by drying and calcination to produce a body mix ready for fabrication. This method has the additional advantage that excellent distributions of the bismuth compound and accessory oxide may be had. An example of this method is the following:

*Example 2*

To a freshly precipitated slurry of tin hydrate containing 3820 gms. $SnO_2$ together with alkali equivalent to about 300 gms. NaOH, was added with continuous agitation a slurry consisting of 250 gms. $Bi(NO_3)_3 \cdot 5H_2O$ and 15 gms. $FeSO_4 \cdot (NH_4)_2SO_4 \cdot 6H_2O$ in 1 liter of water. The mixture was then heated to 80° C. and neutralized with 10% $H_2SO_4$ solution to a pH of 3.0. The precipitated material was then washed several times by decantation and finally dewatered in a vacuum filter. The cake was dried and calcined in fireclay dishes at 1000° C. for 1 hour. The calcined material was found to contain approximately 3% $Bi_2O_3$ and .1% $Fe_2O_3$. The material was then fashioned into discs in the manner hereinbefore described. These discs exhibited substantially the same properties as those prepared by the first described method.

*Examples 3–6*

Following the procedure of Example 1, and utilizing essentially iron-free tin oxide the following four bodies were prepared:

| Composition | Maturing temperature |
|---|---|
| Example 3 — {0.5% $Bi_2O_3$, added as $BiONO_3.H_2O$ / 0.3% NiO, added as $NiCO_3$ / remainder $SnO_2$} | 2,750° F. (1,510° C.) |
| Example 4 — {5% $Bi_2O_3$, added as $BiF_3$ / 0.05% ZnO, added as $ZnSO_4$ / remainder $SnO_2$} | 2,700° F. (1,482° C.) |
| Example 5 — {1% $Bi_2O_3$, added as $Bi_2O_2CO_3$ / 0.2% CoO, added as $CoCO_3$ / remainder $SnO_2$} | 2,400° F. (1,316° C.) |
| Example 6 — {10% $Bi_2O_3$, added as $Bi_2(SNO_3)_3$ / 0.1% CuO, added as $Cu(C_2H_3O_2)_2.H_2O$ / remainder $SnO_2$} | 2,400° F. (1,316° C.) |

The maturing (sintering) temperature of these bodies may be varied, dependent upon the composition and the end use desired. It would not be above the sublimation temperature (about 2800° F. for high tin oxide bodies—and as low as about 2100° F. for low tin oxide bodies). It is not contemplated that bodies would be sintered at below about 1100° C.

The ceramic bodies can be fabricated by other common ceramic techniques, such as slip-casting and extrusion. Slip-casting is especially easy for the slips cast easily and age well. Small additions of gums or other temporary binders are usually required for increasing the dry strength of the cast pieces. If the extrusion method is used, other binders or related substances may be used to increase the dry strength and improve the workability of the body.

The bismuth compounds and the minor amounts of accessory oxides may be introduced at various steps in the process, e. g. during blunging, during milling, dry mixing, etc. or as pointed out hereinbefore, more advantageously may be incorporated in the tin oxide during its manufacture by the wet process. To reduce the shrinkage of these tin oxide bodies, use may be made of a considerable portion of grog or precalcined material. If lower firing temperatures are required, the amount of bismuth may be increased, e. g. the bodies containing 3% bismuth trioxide reached zero absorption at about 2600° F., and the bodies containing five percent of the trioxide reached zero absorption at 2300° F.

The ceramic bodies may contain diluent materials that do not adversely affect chemical, physical or electrical properties of the fired body. Thus, the tin oxide usually used in fabricating these bodies may contain a small amount of alumina, e. g., about 1%, with no adverse results.

I have described what I believe to be the best embodiments of my invention. I do not wish, however, to be confined to the embodiments shown, but what I desire to cover by Letters Patent is set forth in the appended claims.

I claim:

1. A ceramic body having low electrical conductance consisting essentially by weight of about 0.03% to about 0.3% of at least one metal oxide selected from the group consisting of iron oxide, nickel oxide, zinc oxide, cobalt oxide, manganese oxide, and copper oxide, about 0.5% to about 50% of bismuth oxide, and the remainder being substantially tin oxide, said composition expressing the analysis of the metal content of said ceramic body expressed in terms of corresponding metal oxides.

2. A ceramic body having low electrcal conductance consisting essentially by weight of about 0.03% to about 0.3% of at least one metal oxide selected from the group consisting of iron oxide, nickel oxide, zinc oxide, cobalt oxide, manganese oxide, and copper oxide, about 1% to about 10% of bismuth oxide, and the remainder being substantially tin oxide, said composition expressing the analysis of the metal content of said ceramic body expressed in terms of corresponding metal oxides.

3. A ceramic body having low electrical conductance consisting essentially by weight of about 0.03% to about 0.3% of at least one metal oxide selected from the group consisting of iron oxide, nickel oxide, zinc oxide, cobalt oxide, manganese oxide, and copper oxide, about 1% to about 3% of bismuth oxide, and the remainder being substantially tin oxide, said composition expressing the analysis of the metal content of said ceramic body expressed in terms of corresponding metal oxides.

4. A ceramic body having low electrical conductance consisting essentially by weight of about 0.03% to about 0.1% of at least one metal oxide selected from the group consisting of iron oxide, nickel oxide, zinc oxide, cobalt oxide, manganese oxide, and copper oxide, about 1% to about 3% of bismuth oxide, and the remainder being substantially tin oxide, said composition expressing the analysis of the metal content of said ceramic body expressed in terms of corresponding metal oxides.

5. A ceramic body consisting essentially by weight of about 0.03% to about 0.1% of iron oxide, about 1% to about 3% of bismuth oxide, and the remainder being substantially tin oxide, said composition expressing the analysis of the metal content of said ceramic body expressed in terms of corresponding metal oxides.

6. A ceramic body consisting essentially by weight of about 0.03% to about 0.1% of iron oxide, about 0.05% to about 0.2% of zinc oxide, about 1% to about 3% bismuth oxide and the remainder being substantially tin oxide, said composition expressing the analysis of the metal content of said ceramic body expressed in terms of corresponding metal oxides.

7. A ceramic body consisting essentially by weight of about 0.03% to about 0.1% of iron oxide, about 0.05% to about 0.2% of copper oxide, about 1% to about 3% of bismuth oxide and the remainder being substantially tin oxide, said composition expressing the analysis of the metal content of said ceramic body expressed in terms of corresponding metal oxides.

8. A ceramic body consisting essentially by weight of about 0.03% to about 0.2% of iron oxide, about 1% to about 10% of bismuth oxide, and the remainder being substantially tin oxide, said composition expressing the analysis of the metal content of said ceramic body expressed in terms of corresponding metal oxides.

9. A ceramic body consisting essentially by weight of about 0.03% to about 0.1% of iron oxide, about 0.05% to about 0.2% of zinc oxide, about 1% to about 10% bismuth oxide and the remainder being substantially tin oxide, said composition expressing the analysis of the metal content of said ceramic body expressed in terms of corresponding metal oxides.

10. The method of preparing ceramic material consisting essentially by weight of about 0.5% to about 50% of bismuth oxide, about 0.03% to about 0.3% of at least one compound selected from the group consisting of iron, nickel, zinc, cobalt, manganese and copper compounds and the remainder tin oxide, which comprises preparing a precipitated slurry of tin hydrate, adding thereto with agitation a slurry of a water soluble bismuth salt and at least one water soluble salt selected from the group consisting of iron, nickel, zinc, cobalt, copper and manganese salts, heating the suspended mixture, neutralizing and removing the precipitated material, and calcining said material, said composition expressing the analysis of the metal content of said ceramic body expressed in terms of corresponding metal oxides.

11. The method of preparing ceramic material consisting essentially by weight of about 1% to about 3% of bismuth oxide, about 0.03% to about 0.1% of at least one compound selected from the group consisting of iron, nickel, zinc, cobalt, manganese and copper compounds, and the remainder tin oxide, which comprises preparing a precipitated slurry of tin hydrate, adding thereto with agitation a slurry of a water soluble bismuth salt and at least one water soluble salt selected from the group consisting of iron, nickel, zinc, cobalt, copper and manganese salts, heating the suspended mixture, neutralizing and removing the precipitated material, and calcining said material, said composition expressing the analysis of the metal content of said ceramic body expressed in terms of corresponding metal oxides.

12. The process of forming a ceramic body comprising mixing between about 0.5% and about 50% by weight of a material selected from the class consisting of bismuth oxide, bismuth stannate, and bismuth compounds decomposable to the oxide at a temperature not higher than the sintering temperature; between about 0.03% and about 0.3% by weight of at least one compound selected from the class consisting of the oxides and stannates of iron, nickel, zinc, cobalt, manganese and copper, and compounds of iron, nickel, zinc, cobalt, manganese and copper decomposable to the oxide at a temperature not higher than the sintering temperature; the remainder consisting essentially of tin oxide; forming said material into a body; and sintering said material to form a sintered ceramic body.

13. The process of forming a ceramic body comprising mixing between about 1% and about 3% by weight of a material selected from the class consisting of bismuth oxide, bismuth stannate, and bismuth compounds decomposable to the oxide at a temperature not higher than the sintering temperature; between about 0.03% and about 0.1% by weight of at least one compound selected from the class consisting of the oxides and stannates of iron, nickel, zinc, cobalt, manganese and copper, and compounds of iron, nickel, zinc, cobalt, manganese and copper decomposable to the oxide at a temperature not higher than the sintering temperature; the remainder consisting essentially of tin oxide; forming said material into a body; and sintering said material to form a sintered ceramic body.

References Cited in the file of this patent
UNITED STATES PATENTS

| | | |
|---|---|---|
| 2,490,825 | Mochel | Dec. 13, 1949 |
| 2,585,341 | Mochel | Feb. 12, 1952 |